United States Patent [19]

Young

[11] Patent Number: 4,497,708
[45] Date of Patent: Feb. 5, 1985

[54] DEVICE FOR MAGNETICALLY RECLAIMING OIL FROM WATER

[76] Inventor: James M. Young, 3417 Voorde Dr., South Bend, Ind. 46628

[21] Appl. No.: 468,854

[22] Filed: Feb. 22, 1983

Related U.S. Application Data

[63] Continuation of Ser. No. 295,855, Aug. 24, 1981, abandoned.

[51] Int. Cl.³ .............................................. B01B 35/06
[52] U.S. Cl. .................................. 210/222; 210/242.3
[58] Field of Search ............ 210/695, 924, 923, 242.3, 210/925, 776, 680, 611, 242.1, 222, 223; 239/681; 204/DIG. 5

[56] References Cited

U.S. PATENT DOCUMENTS

| | | | |
|---|---|---|---|
| 3,717,573 | 2/1973 | Warren | 210/680 |
| 3,767,571 | 10/1973 | Lorenc et al. | 210/695 |
| 3,800,950 | 4/1974 | Hess et al. | 210/294 |
| 4,060,487 | 11/1977 | Samsel | 210/923 |
| 4,206,000 | 6/1980 | Schuchardt et al. | 210/242.1 |

*Primary Examiner*—Richard V. Fisher
*Assistant Examiner*—Sharon T. Cohen
*Attorney, Agent, or Firm*—James D. Hall

[57] ABSTRACT

A device which is for reclaiming oil from a body of water and which is mounted on a floating vehicle, including a dispersal mechanism to spread ferromagnetic particles in the oil, a collection apparatus connected to a vacuum chamber, and a pulsating magnetic field for drawing oil impregnated with ferromagnetic particles toward the collection apparatus. The oil-particle mixture is separated in the hold of the floating vehicle.

7 Claims, 8 Drawing Figures

DEVICE FOR MAGNETICALLY RECLAIMING OIL FROM WATER

This application is a continuation of application Ser. No. 295,855, filed Aug. 24, 1981, now abandoned.

SUMMARY OF THE INVENTION

This invention relates to a device for reclaiming oil from a body of water.

The device is mounted on a floating vehicle and uses vacuum and magnetic forces to draw either floating oil or submerged oil into a storage compartment within the vehicle. The device includes apparatus for dispersing ferromagnetic particles in the oil slick, a collector for gathering the oil and particle mixture, and a magnetic source which draws the oil and particle mixture toward the collector. The collector is connected to a storage chamber in the hold of the floating vehicle by a vacuum tube which draws the oil and particle mixture into the storage chamber from the collector. In the storage chamber the oil and particles are separated. The oil is stored and the particles are cleaned for further use in oil reclamation.

Accordingly, it is an object of this invention to provide a novel and practical apparatus for reclaiming of floating oil from a body of water.

Another object of this invention is to provide an apparatus for reclaiming oil from a body of water with magnetic and vacuum forces.

Yet another object of this invention is to provide an apparatus for the collection of oil from a body of water that ensures easy collection, separation and transportation of the oil.

Another object of this invention is to provide an apparatus for reclaiming surface oil and sub-surface oil from a body of water.

Other objects of this invention will become apparent from the following description.

DESCRIPTION OF THE PREFERRED EMBODIMENTS

The preferred embodiments illustrated are not intended to be exhaustive or to limit the invention to the precise forms disclosed. They are chosen and described in order to explain the principles of the invention and its application and practical use to thereby enable others skilled in the art to utilize the invention.

Figure 1:
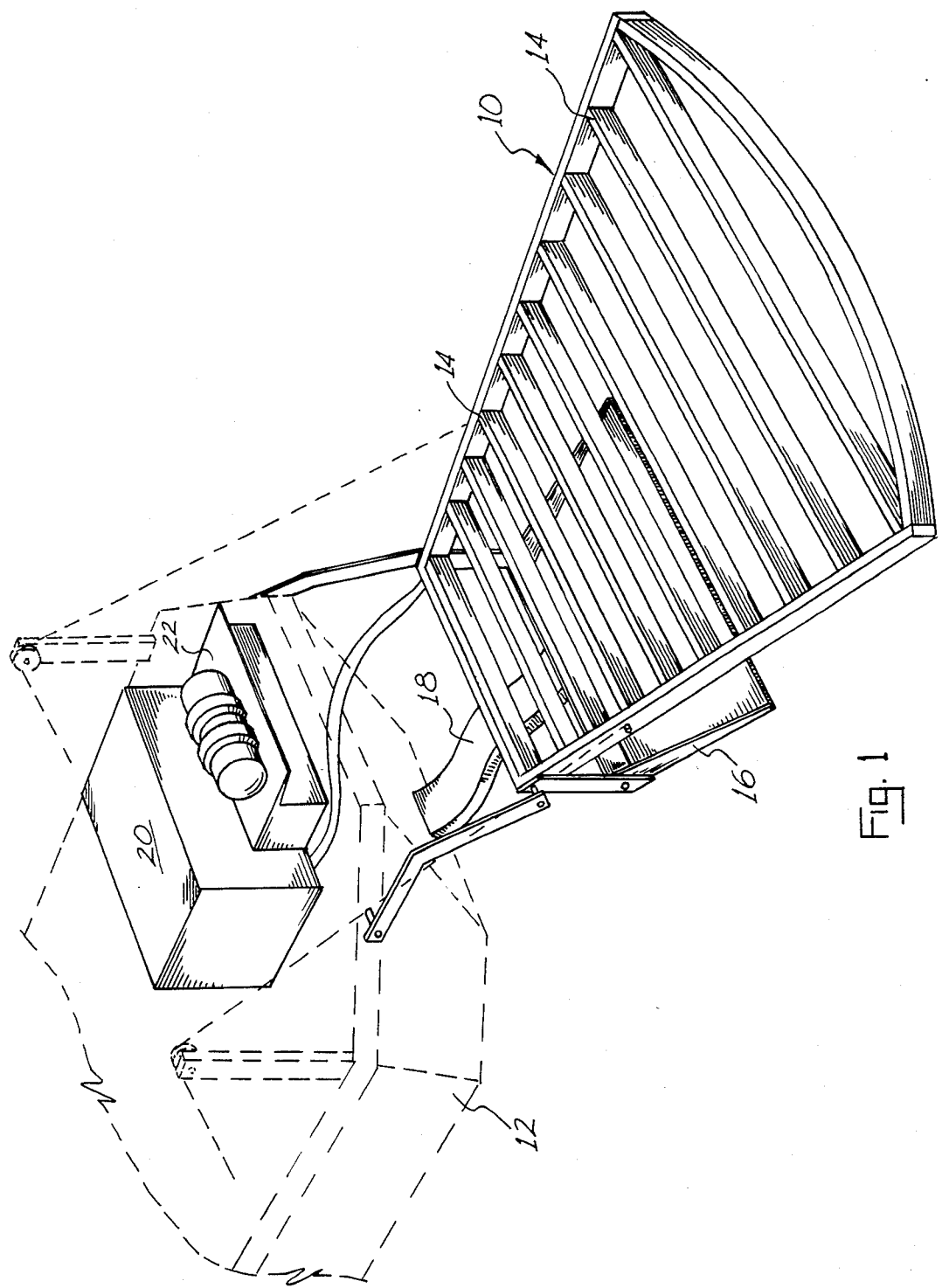
FIG. 1 is a perspective view of one embodiment of the invention of reclaiming of oil from the surface of a body of water with the floating vehicle shown in partial broken line form.
Figure 2:
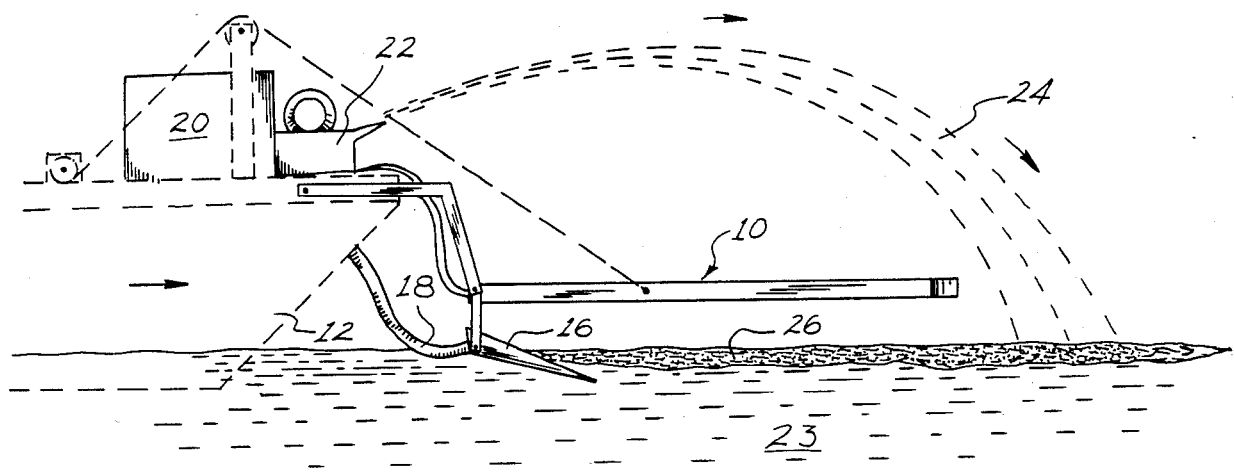
FIG. 2 is a side view of the embodiment of the invention shown in FIG. 1.
Figure 3:
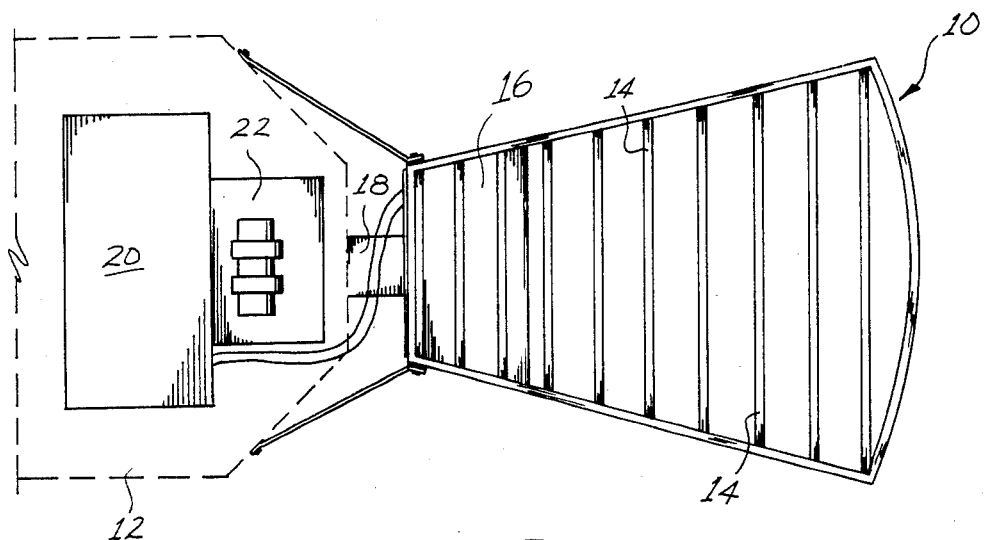
FIG. 3 is a top view of the embodiment of the invention shown in FIG. 1.

The embodiment of the invention which is shown in FIGS. 1-3 is for reclamation of oil that is floating on the surface of a body of water. This embodiment includes a frame or grid 10 which is suspended in cantilever fashion from a floating boat or vehicle 12. Grid 10 is composed of a series of parallel electromagnetic cross members 14 spaced from each other. A collector 16 having the shape of a tapered ramp is positioned beneath grid 10 and is connected to a storage compartment in floating vehicle 12 by a suction tube 18. A pump or similar means, not shown, supplies the vacuum or pulling force within tube 18. Power to form the magnetic field is supplied to cross members 14 in fore to aft sequential fashion by a power device 20 carried by floating vehicle 12. An impeller 22 is also carried by floating vehicle 12 and disperses small ferromagnetic particles 24, such as iron, into the water 23 forwardly of grid 10. Particles 24 are of a size and specific gravity so as to become suspended in an oil slick, indicated at 26, rather than passing through the oil and sinking to the bottom of the body of water.

In use, impeller 22 disperses ferromagnetic particles 24 onto oil slick 26 with the particles sinking into the slick, whereupon the particles will be moved toward collector 16 by electromagnetic cross members 14 and the forward motion of floating vehicle 12, drawing the adhered oil with them. Upon reaching collector 16, the oil and particles are drawn into floating vehicle 12 by suction tube 18 where they are separated and the oil is put in storage and the particles are cleaned with a solvent and used again.

Figure 4:
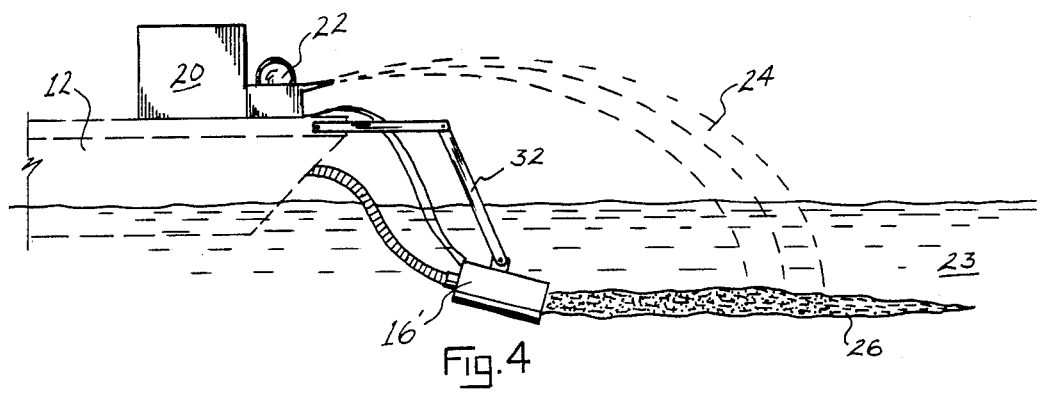
FIG. 4 is a side view of a second embodiment of the invention.

In the second and third embodiments, illustrated in FIGS. 4-7, the invention is used to reclaim oil from beneath the surface of a body of water. For this purpose, collector 16' is cylindrical in shape having a tapered bore 28 therethrough which is connected to suction tube 18 at its narrow end. As illustrated in FIG. 4, impeller 22 casts ferromagnetic particles 24 into the water 23 ahead of collector 16'. The particles 24 used for sub-surface reclamation have a specific gravity such that they sink through the water to the submerged oil 26. Collector 16' has an electromagnet 30 surrounding bore 28 which is activated by power device 20 in a pulsing manner to both draw particles 24 and the adhered oil 26 into the collector and release the particles from the magnetic field to allow the oil and particles to be drawn into floating vehicle 12 through 18. Collector 16' is suspended from floating vehicle 12 by an arm 32 and is ajustable to different depths within the body of water.

Figure 5:
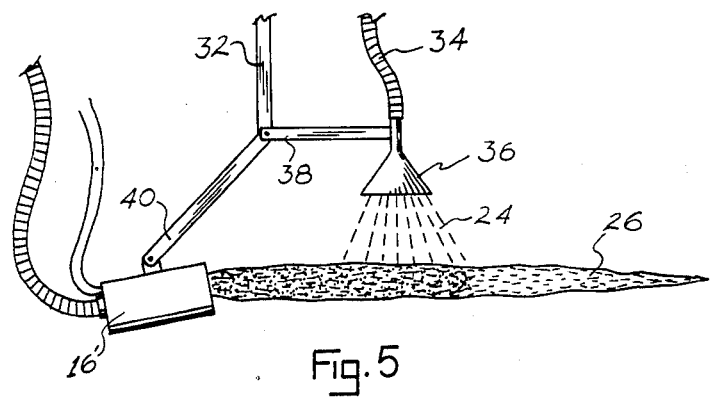
FIG. 5 is a fragmentary side view of a third embodiment of the invention used for the reclamation of sub-surface oil.
Figure 6:
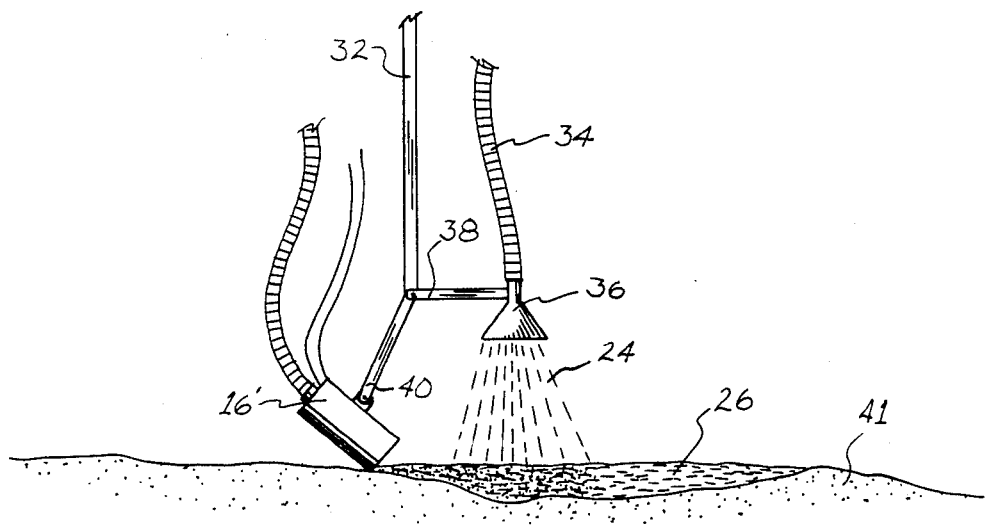
FIG. 6 is a fragmentary side view of the embodiment of FIG. 5 illustrating reclamation of oil from the bottom of a body of water.
Figure 7:
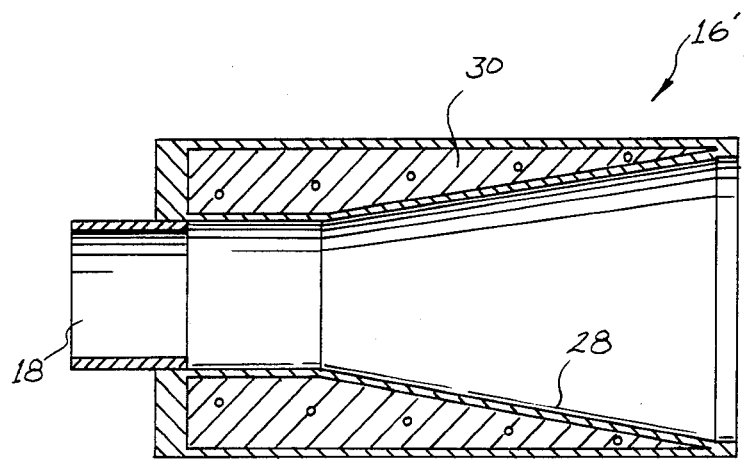
FIG. 7 is a longitudinal cross section of the collector of the embodiments shown in FIGS. 4 and 5.

FIGS. 5 and 6 show a third embodiment wherein ferromagnetic particles 24 are dispersed in the submerged oil by a tube 34 attached at one end to impeller 22 and tapered at its other end 36 to aid in dispersal of the particles. Tube 34 is positioned forwardly of collector 16' by an arm part 38 attached to arm 32. Collector 16' is attached to arm 32 by an arm part 40 which pivots about arm 32 to position the collector for reclaiming oil suspended at a certain depth, as illustrated in FIG. 5, or reclaiming oil from the bottom 41, as illustrated in FIG. 6.

Figure 8:
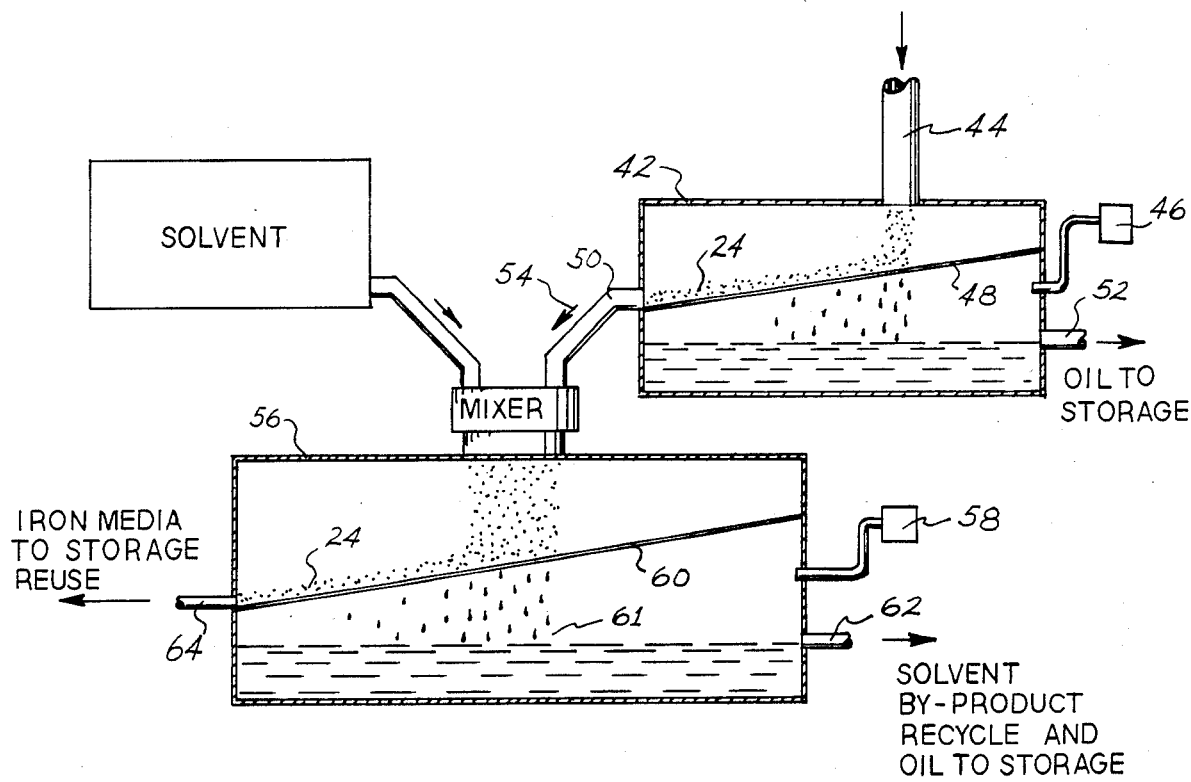
FIG. 8 is a flow diagram of the process for separating the ferromagnetic particles from the reclaimed oil.

FIG. 8 illustrates by way of a flow diagram the process for removing ferromagnetic particles 24 from the oil that is drawn into floating vehicle 12. As the oil and particle mixture is drawn into floating vehicle 12 through tube 18, it enters a separation tank 42 through an inlet 44. A negative pressure is maintained in tank 42 with a vacuum pump 46. The oil and particle mixture falls from inlet 44 onto a tilted mesh divider 48 which allows oil to fall through to the bottom of tank 42 but which causes ferromagnetic particles 24 to roll to an outlet 50. The oil in the bottom of tank 42 is carried to a storage tank by an outlet 52. From separation tank 42, ferromagnetic particles 24 pass to a mixer, as indicated by arrow 54, where they are mixed with a solvent and fall from the mixer to a second separation tank 56. Tank 56 is also held at a negative pressure by a vacuum pump 58. The solvent removes any remaining oil from ferromagnetic particles 24. The oil and particles are separated by a tilted mesh divider 60 which allows the solvent and oil mixture 61 to fall to the bottom of tank 56 where it is removed through an outlet 62. The particles 24 roll from divider 60 to a storage bin for reuse through outlet 64. The oil and solvent mixture is chemically separated with the oil being stored and the solvent being used again for cleaning other particles 24.

It is to be understood that the invention is not to be limited to the above described description but may be modified within the scope of the appended claims.

What I claim is:

1. In a combination, a floating vehicle and a device for reclaiming oil from a body of water comprising impeller means mounted on said vehicle for distributing ferromagnetic particles in said oil, said vehicle carrying means for drawing said oil and particles from said water after the oil is saturated with the particles, said drawing means in communication with a storage facility in said vehicle, a magnetic grid means cantilevered from said vehicle and spaced above said oil and water adjacent said drawing means for concentrating the particle impregnated oil under the grid means and adjacent the drawing means, said grid including means for providing a magnetic field in a pulsating manner to allow said drawing means to create a flow of said oil particles to said storage facility and pumping means for causing said concentrated oil and particles to enter said storage facility from said drawing means.

2. The combination of claim 1 and means mounting said impeller means on said vehicle for casting said ferromagnetic particles forwardly of said magnetic grid means.

3. The combination of claim 2 wherein said grid includes parallel members spaced from said vehicle and the means for providing a pulsating field includes means for magnetizing the parallel members sequentially from the fore to the aft ends of the grid to create a flow of said oil and particles toward said drawing means.

4. The combination of claim 1 wherein said impeller means includes a nozzle positioned within said water and forwardly of said body, whereby said ferromagnetic particles can be dispersed from the nozzle beneath the surface of the water.

5. The combination of claim 1 wherein said drawing means is positioned to skim the surface of said water.

6. In a combination, a floating vehicle and a device for reclaiming oil from a body of water comprising impeller means mounted on said vehicle for distributing ferromagnetic particles in said oil, said vehicle carrying means for drawing said oil and particles from said water after the oil is saturated with the particles, a storage facility in said vehicle, said drawing means including a body having a cylindrical side wall defining a bore therethrough suspended from said floating vehicle beneath the surface of said water, said body bore in communication with said storage facility wherein said oil and particles can pass to said storage facility, magnetic field means in said body side wall around said bore, means for energizing said magnetic field means in a pulsating manner to allow said drawing means to create a flow of said oil and particles from said bore body to said storage facility, and a support extending between said body and vehicle to suspend the body within said water, whereby oil may be recovered from beneath the surface of said water.

7. The combination of claim 6 wherein said body side wall tapers from the front to the rear of said body.

* * * * *